United States Patent
Liu et al.

(10) Patent No.: US 10,409,766 B2
(45) Date of Patent: Sep. 10, 2019

(54) COMPUTER SUBSYSTEM AND COMPUTER SYSTEM WITH COMPOSITE NODES IN AN INTERCONNECTION STRUCTURE

(71) Applicant: Huawei Technologies Co., Ltd., Shenzhen (CN)

(72) Inventors: Jiangen Liu, Shenzhen (CN); Chenghong He, Shenzhen (CN); Haibin Wang, Hangzhou (CN); Xinyu Hou, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 73 days.

(21) Appl. No.: 15/845,450

(22) Filed: Dec. 18, 2017

(65) Prior Publication Data
US 2018/0107628 A1    Apr. 19, 2018

Related U.S. Application Data

(63) Continuation of application No. 15/150,419, filed on May 9, 2016, now Pat. No. 9,880,972, which is a (Continued)

(51) Int. Cl.
*G06F 9/30* (2018.01)
*G06F 15/80* (2006.01)
(Continued)

(52) U.S. Cl.
CPC .......... *G06F 15/80* (2013.01); *G06F 13/4221* (2013.01); *G06F 15/167* (2013.01); *G06F 15/17337* (2013.01)

(58) Field of Classification Search
None
See application file for complete search history.

(56) References Cited

U.S. PATENT DOCUMENTS

| 5,367,636 A | 11/1994 | Colley et al. |
| 6,230,252 B1 | 5/2001 | Passint et al. |

(Continued)

FOREIGN PATENT DOCUMENTS

| CN | 1334426 A | 2/2002 |
| CN | 1537376 A | 10/2004 |

(Continued)

OTHER PUBLICATIONS

Machine Translation and Abstract of Chinese Publication No. CN1710529, Dec. 21, 2005, 8 pages.
(Continued)

*Primary Examiner* — William B Partridge
(74) *Attorney, Agent, or Firm* — Conley Rose, P.C.

(57) ABSTRACT

A computer subsystem and a computer system, where the computer subsystem includes L composite nodes (CNs), each CN includes M basic nodes, each basic node includes N central processing units (CPUs) and one node controller (NC). Any two CPUs in each basic node are interconnected. Each CPU in each basic node is connected to the NC in the basic node. The NC in each basic node has a routing function. Any two NCs in the M basic nodes are interconnected. A connection between the L CNs formed through connections between NCs enables communication between any two NCs to be no more than three hops. Hence, the computer subsystem and the computer system can reduce the kinds and the number of interconnection chips, and simplify an interconnection structure of a system, thereby improving reliability of the system.

3 Claims, 6 Drawing Sheets

Related U.S. Application Data continuation of application No. 13/670,718, filed on Nov. 7, 2012, now Pat. No. 9,336,179, which is a continuation of application No. PCT/CN2011/076279, filed on Jun. 24, 2011.

(51) Int. Cl.
*G06F 15/173* (2006.01)
*G06F 15/167* (2006.01)
*G06F 13/42* (2006.01)

(56) References Cited

U.S. PATENT DOCUMENTS

| | | | |
|---|---|---|---|
| 2001/0035278 | A1 | 11/2001 | Weyer et al. |
| 2003/0018927 | A1 | 1/2003 | Gadir et al. |
| 2003/0039262 | A1 | 2/2003 | Wong et al. |
| 2005/0021699 | A1 | 1/2005 | Kota et al. |
| 2005/0080894 | A1 | 4/2005 | Apostolopoulos et al. |
| 2006/0075145 | A1 | 4/2006 | Mueller |
| 2006/0106931 | A1 | 5/2006 | Richoux |
| 2006/0174048 | A1 | 8/2006 | Ohara et al. |
| 2006/0224685 | A1 | 10/2006 | Begun et al. |
| 2007/0106833 | A1 | 5/2007 | Rankin et al. |
| 2008/0222303 | A1 | 9/2008 | Archer et al. |
| 2010/0002707 | A1 | 1/2010 | Chang et al. |
| 2011/0010468 | A1 | 1/2011 | Hu et al. |
| 2011/0055452 | A1 | 3/2011 | Suzuki et al. |

FOREIGN PATENT DOCUMENTS

| | | | |
|---|---|---|---|
| CN | 1554055 | A | 12/2004 |
| CN | 1710529 | A | 12/2005 |
| CN | 1811744 | A | 8/2006 |
| CN | 1841330 | A | 10/2006 |
| CN | 101027658 | A | 8/2007 |
| CN | 101076790 | A | 11/2007 |
| CN | 101216815 | A | 7/2008 |
| CN | 101330426 | A | 12/2008 |
| CN | 101635679 | A | 1/2010 |
| EP | 1125657 | A2 | 8/2001 |

OTHER PUBLICATIONS

Machine Translation and Abstract of Chinese Publication No. CN101330426, Dec. 24, 2008, 16 pages.
Machine Translation and Abstract of Chinese Publication No. CN1334426, Feb. 6, 2002, 17 pages.
Kota, R., et al., "Horus: Large-Scale Symmetric Multiprocessing for Opteron Systems," XP011134866, IEEE Micro, IEEE Service Center, vol. 25, No. 2, Mar. 2005, pp. 30-40.
"An Introduction to the Intel QuickPath Interconnect," XP055059695, Document No. 320412-001US, Jan. 2009, 22 pages.
Bode, A., "Parallelrechner: Architekturen-Systeme-Werkzeuge" In: "Parallelrechner: Architekturen-Systeme_Werkzeuge," XP055059805, Jan. 1995, 10 pages.
Foreign Communication From a Counterpart Application, Chinese Application No. 201180000848.9, Chinese Office Action dated Nov. 27, 2012, 4 pages.
Foreign Communication From a Counterpart Application, European Application No. 11857888.9, Extended European Search Report dated Apr. 24, 2013, 7 pages.
Foreign Communication From a Counterpart Application, Chinese Application No. 201180000848.9, Chinese Office Action dated May 3, 2012, 5 pages.
Foreign Communication From a Counterpart Application, PCT Application No. PCT/CN2011/076279, English Translation of International Search Report dated Mar. 29, 2012, 4 pages.
Foreign Communication From a Counterpart Application, PCT Application No. PCT/CN2011/076279, English Translation of Written Opinion dated Mar. 29, 2012, 4 pages.

COMPUTER SUBSYSTEM AND COMPUTER SYSTEM WITH COMPOSITE NODES IN AN INTERCONNECTION STRUCTURE

CROSS-REFERENCE TO RELATED APPLICATIONS

This application is a continuation of U.S. patent application Ser. No. 15/150,419 filed on May 9, 2016. The U.S. patent application Ser. No. 15/150,419 is a continuation of U.S. patent application Ser. No. 13/670,718 filed on Nov. 7, 2012, now U.S. Pat. No. 9,336,179. The U.S. patent application Ser. No. 13/670,718 is a continuation of the International Patent Application No. PCT/CN2011/076279 filed on Jun. 24, 2011. All of the aforementioned patent applications are hereby incorporated by reference in their entireties.

TECHNICAL FIELD

The present disclosure relates to the computer field, and in particular, to a computer subsystem and a computer system in the computer field.

BACKGROUND

From the perspective of system architecture, current business servers may be generally categorized into three types, namely, the symmetric multi-processor (SMP) structure, the non-uniform memory access (NUMA) structure, and the massive parallel processing (MPP) structure.

A so-called server with the SMP structure refers to a server, in which multiple central processing units (CPUs) work symmetrically and do not have a primary-secondary or master-slave relationship, each CPU shares the same physical memory, and the time needed by each CPU to access any address in the memory is the same. However, a server of this type has very limited performance in scalability. A server with the NUMA structure is basically characterized by having multiple CPU modules, each CPU module is formed of multiple (for example, four) CPUs and has an independent local memory and input/output (I/O) slots, nodes may be interconnected and exchange information through an interconnection module. Therefore, the speed of a CPU accessing a local memory is much higher than that of accessing a remote memory (a memory of another node in the system). Furthermore, for a server of this type, when the number of CPU increases, the performance of the server cannot be improved linearly. In a server with the MPP structure, multiple servers with the SMP structure are connected by a certain node interconnection network, each node of a server with the SMP structure may run an operating system and database thereof, but a CPU in each node cannot access the memory of another node, and information exchange between nodes is implemented through an interconnection network between the nodes.

At present, a business server usually adopts a multi-node interconnection structure. In the multi-node interconnection structure, each node is a data processing module, the data processing module includes multiple (for example, two) CPUs that are interconnected and a node controller (NC). The nodes or data processing modules are connected through an interconnection module, and the interconnection module is usually formed of multiple interconnection chips, such as crossbar switches (Xbar). Therefore, for the server formed by connecting nodes or data processing modules through an interconnection module, not only many kinds and a large quantity of interconnection chips are required, and the connection is complicated, but also the reliability of the system is poor, and the delay of the inter-node accessing is long, thereby affecting the running efficiency of the system.

SUMMARY

Embodiments of the present disclosure provide a computer subsystem and a computer system which are capable of reducing the kinds and the number of interconnection chips, and at the same time simplifying an interconnection structure of a system, improving reliability of the system, and shortening delay of inter-node accessing, thereby improving running efficiency of the system.

In one aspect, an embodiment of the present disclosure provides a computer subsystem. The computer subsystem includes L composite nodes (CNs), each CN includes M basic nodes, each basic node includes N CPUs and one NC, where any two CPUs in each basic node are interconnected, each CPU in each basic node is connected to the NC in the basic node, the NC in each basic node has a routing function, any two NCs in the M basic nodes are interconnected, and a connection between the L CNs formed through a connection between NCs of different CNs enables communication between any two NCs to require three hops at most, where L is a natural number and L is greater than or equal to 4, M is a natural number and M is greater than or equal to 1, and N is a natural number and N is greater than or equal to 2.

In another aspect, an embodiment of the present disclosure provides a computer system. The computer system includes two identical computer subsystems according to the embodiment of the present disclosure, where a first computer subsystem or a second computer subsystem includes L CNs, each CN includes M basic nodes, each basic node includes N CPUs and one NC, any two CPUs in each basic node are interconnected, each CPU in each basic node is connected to the NC in the basic node, the NC in each basic node has a routing function, any two NCs in the M basic nodes are interconnected, and a connection between the L CNs formed through a connection between NCs of different CNs enables communication between any two NCs to require three hops at most, where L is a natural number and L is greater than or equal to 4, M is a natural number and M is greater than or equal to 1, and N is a natural number and N is greater than or equal to 2. At least one NC in each CN of the first computer subsystem and an NC of a corresponding basic node in a corresponding CN of the second computer subsystem are interconnected.

Based on the foregoing technical solutions, in the computer subsystem and the computer system according to embodiments of the present disclosure, by directly connecting an NC having a routing function to a CPU, Xbar interconnection chips are avoided, thereby reducing the kinds and the number of interconnection chips, and at the same time simplifying an interconnection structure of a system, and improving the reliability of the system. Furthermore, through the connections between NCs, communication between any two NCs needs three hops at most, thereby shortening the delay of inter-node accessing and improving the running efficiency of the system.

BRIEF DESCRIPTION OF THE DRAWINGS

To illustrate the technical solutions according to the embodiments of the present disclosure more clearly, the accompanying drawings for describing the embodiments of the present disclosure are introduced briefly in the follow

DETAILED DESCRIPTION OF THE EMBODIMENTS

The technical solutions according to the embodiments of the present disclosure are clearly and completely described in the following with reference to the accompanying drawings. The embodiments in the following description are a part rather than all of the embodiments of the present disclosure. All other embodiments obtained by persons skilled in the art based on the embodiments of the present disclosure without creative efforts shall fall within the protection scope of the present disclosure.

Figure 1:
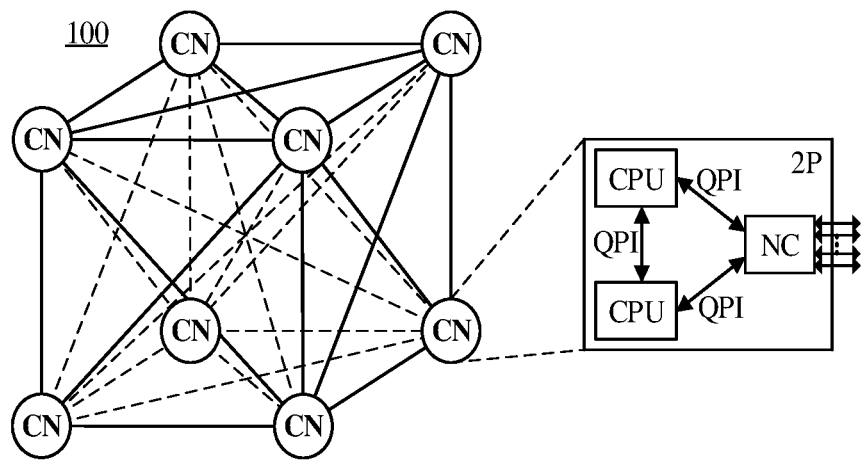
- FIG. 1 is a schematic structural block diagram of a computer subsystem according to an embodiment of the present disclosure.

FIG. 1 is a schematic structural block diagram of a computer subsystem 100 according to an embodiment of the present disclosure. The computer subsystem 100 according to the embodiment of the present disclosure includes L CNs, each CN includes M basic nodes, each basic node includes N CPUs and one NC, any two CPUs in each basic node are interconnected, each CPU in each basic node is connected to an NC in the basic node, an NC in each basic node has a routing function, any two NCs in the M basic nodes are interconnected, and a connection between the L CNs formed through a connection between NCs of different CNs enables communication between any two NCs to require three hops at most, where L is a natural number and L is greater than or equal to 4, M is a natural number and M is greater than or equal to 1, and N is a natural number and N is greater than or equal to 2.

Further, for example, as shown in FIG. 1, the computer subsystem 100 includes eight CNs, each CN includes one basic node, and the basic node includes two CPUs and one NC. In the basic node, the two CPUs are interconnected and both connected to the NC, and the NC has a routing function, that is, each interconnection interface in the NC supports full routing and switching and is capable of routing information from an NC of an adjacent basic node to an NC of another adjacent node. The eight CNs are connected through connections between different CNs and any two NCs are interconnected directly. In this manner, communication between any two NCs needs only one hop. That is, in the embodiment shown in FIG. 1, L is 8, M is 1, and N is 2, and the connections between CNs enable the communication between any two NCs to needs only one hop.

It should be understood that the embodiment of the present disclosure is merely described by taking an example of the computer subsystem 100 shown in FIG. 1, but the computer subsystem 100 is not intended to impose any limitation on the present disclosure.

In the computer subsystem 100 according to the embodiment of the present disclosure, by directly connecting an NC having a routing function to a CPU, Xbar interconnection chips can be avoided such that the kinds and the number of interconnection chips are reduced, and at the same time the interconnection structure of the system is simplified to avoid a higher failure rate caused by complicated connections, thereby improving the reliability of the system. Furthermore, through the connections between the NCs, the communication between any two NCs needs three hops at most, thereby shortening the delay of inter-node accessing and improving the running efficiency of the system.

Figure 2A:
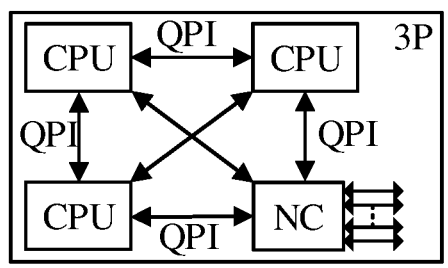
FIG. 2A and FIG. 2B are schematic block diagrams of a basic node 3P and a basic node 4P in a computer subsystem according to an embodiment of the present disclosure.
Figure 2B:
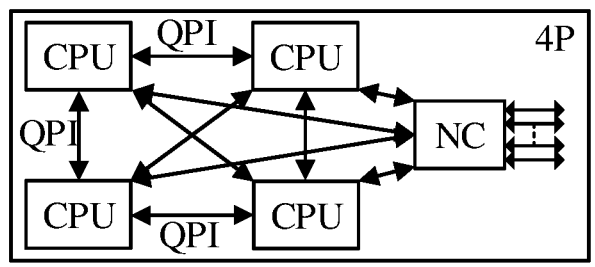

In an embodiment of the present disclosure, each basic node may include N CPUs and an NC, where N is a natural number and N is greater than or equal to 2. For example, as shown in FIG. 2A, a basic node 3P includes three CPUs and an NC, any two CPUs in the basic node 3P are interconnected, each CPU is connected to the NC in the basic node, and the NC in the basic node 3P has a routing function. For example, as shown in FIG. 2B, a basic node 4P includes four CPUs and an NC, and any two CPUs in the basic node 4P are interconnected, that is, any two CPUs are connected directly, all of the four CPUs are connected to the NC in the basic node, and the NC in the basic node 4P has a routing function.

It should be understood that that each basic node has a routing function refers to that an NC in each basic node is capable of routing information from an NC of a first basic node connected to the basic node to an NC of a second basic node connected to the basic node. Because the NC has the routing function, in the computer subsystem, not only the kinds and the number of interconnection chips can be reduced, but also the delay of inter-node accessing can be shortened at the same time and the running efficiency of the system is improved.

Alternatively, as shown in FIG. 1, each basic node includes two CPUs and one NC. Furthermore, following descriptions are made by taking an example of a basic node 2P including two CPUs and one NC, but the present disclosure is not limited to this.

It should be understood that the connection between a CPU and a CPU, the connection between a CPU and an NC, and the connection between an NC and an NC in different CNs may all adopt an interconnection technology in the related art. For example, the connection between a CPU and a CPU and the connection between a CPU and an NC adopt the quick path interconnect (QPI) technology, and the connection between an NC and an NC in different CNs may also adopt the QPI technology.

It should also be understood that, in the embodiment of the present disclosure, descriptions are made by taking an example of a basic node including one NC, but the embodiment of present disclosure is not limited to this, each basic node of a computer subsystem according to the embodiment of the present disclosure may include multiple NCs, for example, each basic node includes at least two CPUs and at least one NC.

In an embodiment of the present disclosure, each CN may include M basic nodes, where M is a natural number and M is greater than or equal to 1, and any two NCs in the M basic nodes are interconnected. For example, as shown in FIGS. 2A and 2B, each CN includes only one basic node, that is, M is 1. For example, M may also be 2, 3, or 4, as shown in FIG. 3A, FIG. 3B, and FIG. 3C, respectively.

Figure 3A:
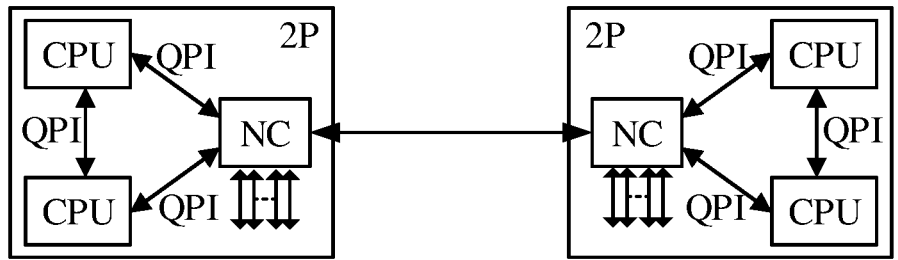
FIGS. 3A, 3B, and 3C are schematic block diagrams of CNs in a computer subsystem according to an embodiment of the present disclosure.
Figure 3B:
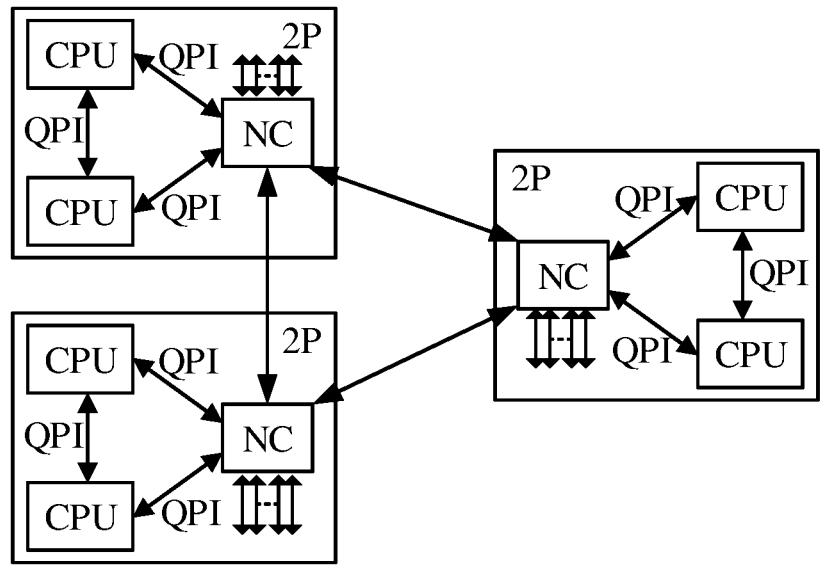
Figure 3C:
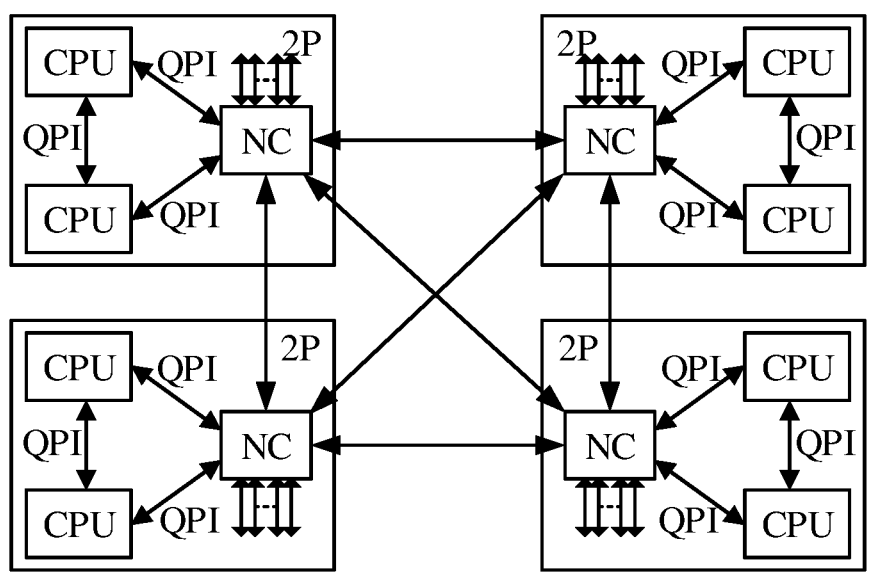

FIGS. 3A, 3B, and 3C are schematic block diagrams of CNs in computer subsystems according to an embodiment of the present disclosure. In FIG. 3A, each CN includes two identical basic nodes 2P, and in each basic node 2P, any two CPUs are interconnected, and each CPU is connected to an NC in the basic node. In the CN, two basic nodes 2P are interconnected through the respective NC of the two basic nodes 2P to form the CN. In FIG. 3B, each CN includes three identical basic nodes 2P, and any two NCs in the three basic nodes 2P are interconnected in order to form the CN. Similarly, in FIG. 3C, each CN includes four identical basic nodes 2P and an NC in each basic node 2P is connected to NCs in the other three basic nodes 2P. In this manner, any two NCs in the four basic nodes 2P are interconnected in order to form the CN.

It should be understood that because any two NCs in M basic nodes are interconnected, and any two NCs are capable of directly communicating with each other in each CN, that is, the communication between any two NCs needs only one hop. Therefore, the delay of accessing between CNs can be further shortened and the running efficiency of the system is improved.

Figure 4A:
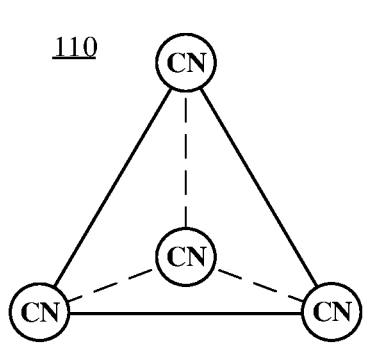
FIGS. 4A, 4B, and 4C are schematic structural block diagrams of computer subsystems with different numbers of CNs according to an embodiment of the present disclosure.
Figure 4B:
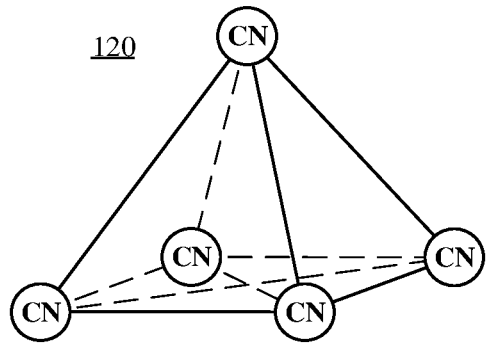
Figure 4C:
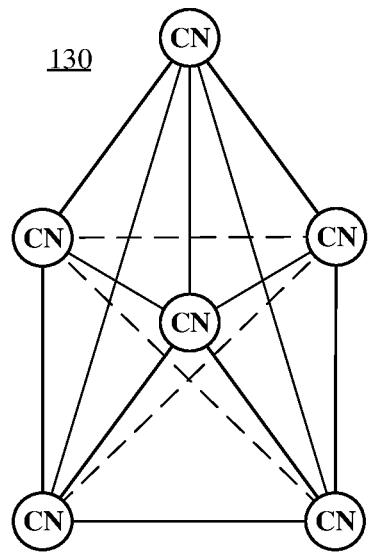

In an embodiment of the present disclosure, a computer subsystem may include L CNs, where L is a nature number and L is greater than or equal to 4, the L CNs are connected through connections between NCs of different CNs, and communication between any two NCs needs three hops at most. FIGS. 4A, 4B, and 4C are schematic structural block diagrams of computer subsystems with different numbers of CNs according to an embodiment of the present disclosure. As shown in FIG. 4A, a computer subsystem 110 includes four CNs, each CN, as shown in FIGS. 3A-3C, may include M basic nodes, each basic node, as shown in FIGS. 2A and 2B, may include N CPUs and an NC, the four CNs are connected through connections between NCs of different CNs, and communication between any two NCs needs three hops at most. Similarly, as shown in FIG. 4B and FIG. 4C, a computer subsystem 120 includes five CNs, and a computer subsystem 130 includes six CNs. Alternatively, a computer subsystem according to an embodiment of the present disclosure includes an even number of CNs, that is, L is an even number and L is greater than or equal to 4. Preferably, as shown in FIG. 1, a computer subsystem includes eight CNs. Following descriptions are made by taking an example of a computer subsystem including eight CNs, but the present disclosure is not limited to this.

It should be understood that in embodiments of the present disclosure, computer subsystems each including L CNs are always presented in a three-dimensional architecture to better display a connection relationship between CNs. In actual applications, the computer subsystem may be arranged in a plane or arranged according to a three-dimensional structure, which is not limited in the present disclosure.

In the embodiment of the present disclosure, the connection between different CNs enables the communication between any two NCs to require three hops at most. For a case in which each CN includes only one basic node, optionally, any two NCs in the L CNs are interconnected. As shown in FIG. 1, the computer subsystem 100 includes eight CNs, each CN includes only one basic node, and an NC of each CN is connected to NCs of the other seven CNs such that the communication between any two NCs needs only one hop. In this case, each CN among the eight CNs is in an absolutely same position.

Figure 5:
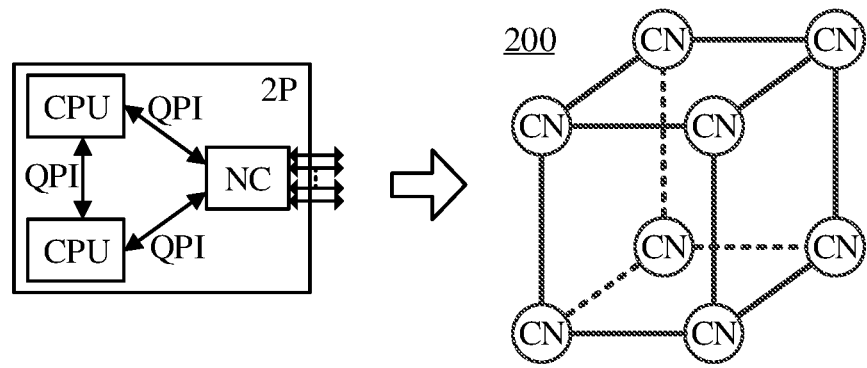
FIG. 5 is a schematic structural block diagram of a computer subsystem according to another embodiment of the present disclosure.

Optionally, as shown in FIG. 5, when each CN includes one basic node, for a computer subsystem 200 including eight CNs, each NC in the eight CNs and other three NCs in the eight CNs are interconnected, and communication between any two NCs in the L CNs needs two hops at most, and therefore the computer subsystem 200 including 16 CPUs is formed. For example, communication between any two CNs on a top face needs one hop, but communication between two CNs at two ends of a body diagonal needs two hops.

Figure 6:
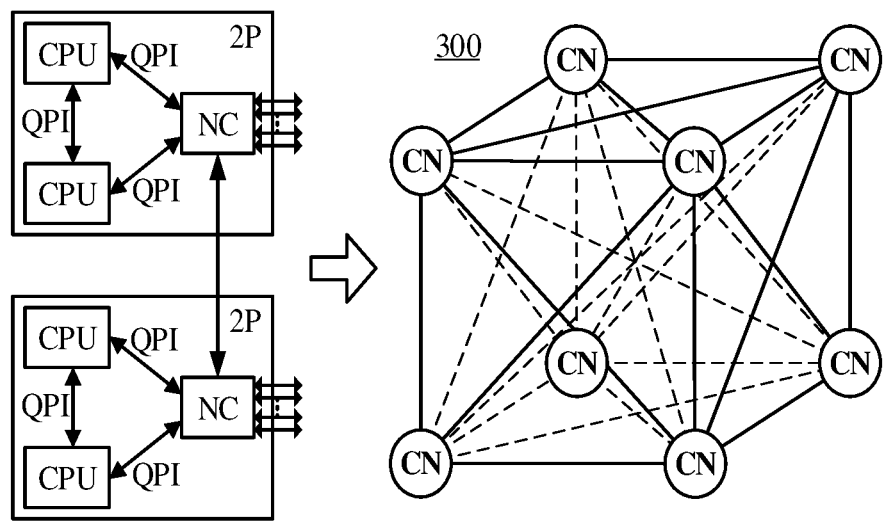
FIG. 6 is a schematic structural block diagram of a computer subsystem according to still another embodiment of the present disclosure.

When each composite includes at least two basic nodes, optionally, NCs of corresponding basic nodes in any two CNs are interconnected. For example, as shown in FIG. 6, a computer subsystem 300 includes eight CNs, each CN includes two basic nodes which are called a first basic node and a second basic node, and each basic node includes two CPUs and one NC. In any CN, an NC of a first basic node is only connected to NCs of first basic nodes in other CNs, and an NC of a second basic node is only connected to NCs of corresponding second basic nodes such that the computer subsystem 300 including 32 CPUs is formed.

Figure 7:
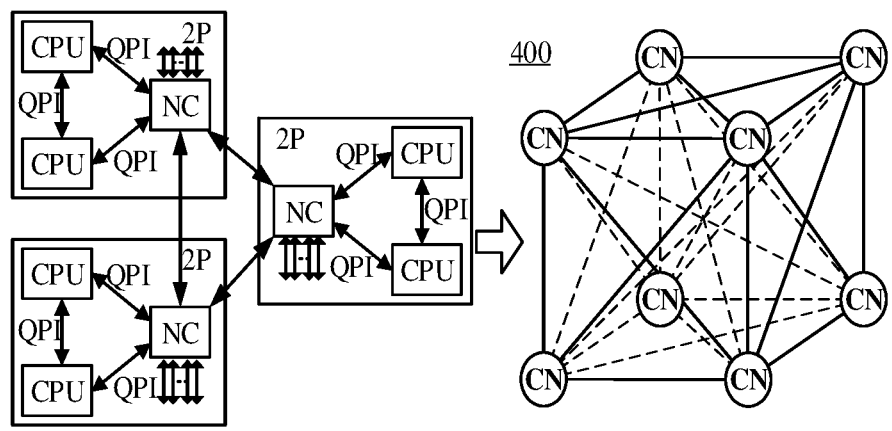
FIG. 7 is a schematic structural block diagram of a computer subsystem according to still another embodiment of the present disclosure.

Similarly, FIG. 7 shows a computer subsystem 400, in which each CN includes three basic nodes. In the computer subsystem 400, the three basic nodes included in each CN may be called a first basic node, a second basic node, and a third basic node respectively. NCs of corresponding basic nodes in any two CNs are interconnected. The word corresponding means that for any two specific CNs, an NC of a first basic node of one CN is only connected to an NC of a first basic node of the other CN, an NC of a second basic node of one CN is only connected to an NC of a second basic node of the other CN, and an NC of a third basic node of one CN is only connected to an NC of a third basic node of the other CN. In this manner, the computer subsystem 400 including 48 CPUs is formed.

For the computer subsystem 400 shown in FIG. 7, it may be understood that the computer subsystem 400 may be considered to include eight CNs, the eight CNs form a cubic structure, each CN corresponds to a vertex of the cube, each vertex is in the absolutely same position, and each CN includes three basic nodes. In another aspect, for the computer subsystem 400, it may also be understood that first basic nodes, second basic nodes, and third basic nodes in each CN form a cubic structure separately, a vertex of each cube corresponds to a basic node, and corresponding vertexes of the three cubes are interconnected, that is, it may be also considered that the computer subsystem 400 includes three computer subsystems 100 shown in FIG. 1 and the corresponding vertexes of the three computer subsystems 100 are interconnected.

Therefore, in the computer subsystem according to the embodiment of the present disclosure, by directly connecting an NC having a routing function to a CPU, Xbar interconnection chips can be avoided such that the kinds and the number of interconnection chips can be reduced, and at the same time the interconnection structure of the system can be simplified to avoid a higher failure rate caused by complicated connections, thereby improving the reliability of the system. Furthermore, through the connections between the NCs, the communication between any two NCs needs three hops at most, thereby shortening the delay of inter-node accessing and improving the running efficiency of the system.

In another aspect, an embodiment of the present disclosure further provides a computer system. The computer system is described below with reference to FIG. 8 to FIG. 10.

Figure 8:
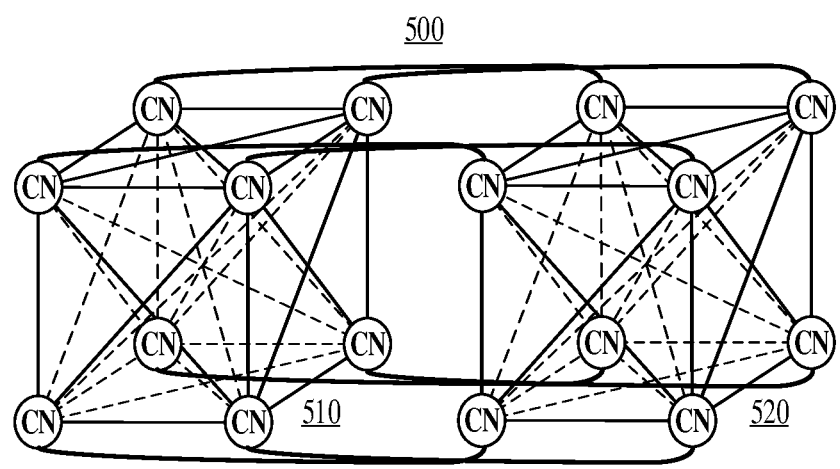
FIG. 8 is a schematic structural block diagram of a computer system according to an embodiment of the present disclosure.

FIG. 8 is a schematic structural block diagram of a computer system 500 according to an embodiment of the present disclosure. The computer system 500 according to an embodiment of the present disclosure includes two identical computer subsystems according to the embodiment of the present disclosure, where a first computer subsystem 510 or a second computer subsystem 520 includes L CNs, each CN includes M basic nodes, each basic node includes N CPUs and one NC, any two CPUs in each basic node are interconnected, each CPU in each basic node is connected to an NC in the basic node, an NC in each basic node has a routing function, any two NCs in the M basic nodes are interconnected, and a connection between the L CNs formed through a connection between NCs of different CNs enables communication between any two NCs to require three hops at most, where L is a natural number and L is greater than or equal to 4, M is a natural number and M is greater than or equal to 1, and N is a natural number and N is greater than or equal to 2. At least one NC in each CN of the first computer subsystem and an NC of a corresponding basic node in a corresponding CN of the second computer subsystem are interconnected.

Further, for example, as shown in FIG. 8, the computer system 500 includes two identical computer subsystems 510 and 520 according to the embodiment of the present disclosure, where at least one NC in each CN of the first computer subsystem 510 and an NC of a corresponding basic node in a corresponding CN of the second computer subsystem 520 are interconnected. For example, each CN of 510 or 520 includes two basic nodes called a first basic node and a second basic node, an NC of a first basic node of a first CN in 510 is connected to an NC of a first basic node of a first CN in 520, an NC of a first basic node of a second CN in 510 is connected to an NC of a first basic node of a second CN in 520, and an NC of a second basic node of a second CN in 510 is connected to an NC of a second basic node of a second CN in 520.

In the embodiment of the present disclosure, each basic node of a computer subsystem may include two CPUs and one NC. Optionally, a computer subsystem may include eight CNs. Optionally, an NC in each basic node of a computer subsystem is capable of routing information from an NC of a first basic node connected to the basic node to an NC of a second basic node connected to the basic node. Optionally, when each CN includes one basic node, any two NCs in the L CNs of the computer subsystem are interconnected. Optionally, when each CN includes one basic node, each NC in the L CNs of the computer subsystem and other three NCs in the L CNs are interconnected, which enables communication between any two NCs in the L CNs to needs two hops at most. Optionally, when M is greater than or equal to 2, NCs of corresponding basic nodes in any two CNs of a computer subsystem are interconnected.

It should be understood that the embodiment of the present disclosure is described by taking an example of a computer subsystem including eight CNs, in which each basic node includes two CPUs and one NC, but the present disclosure is not limited to this.

For example, when the computer system shown in FIG. 8 includes a computer subsystem shown in FIG. 5, a computer system including 32 CPUs may be formed of computer subsystems each including 16 CPUs in a convenient and efficient way, when the computer system shown in FIG. 8 includes a computer subsystem shown in FIG. 6, a computer system including 64 CPUs may be formed of computer subsystems each including 32 CPUs in a convenient and efficient way, when the computer system shown in FIG. 8 includes a computer subsystem shown in FIG. 7, a computer system including 96 CPUs may be formed of computer subsystems each including 48 CPUs in a convenient and efficient way.

Therefore, in the computer system according to the embodiment of the present disclosure, through the interconnection of NCs of corresponding basic nodes in corresponding CNs of two identical computer subsystems, not only the kinds and the number of interconnection chips can be reduced, and the interconnection structure of the system can be simplified to avoid a higher failure rate caused by complicated connections, thereby enhancing the reliability of the system and improving the running efficiency of the system. Furthermore, the number of CPUs of an interconnected system may be increased in an efficient way, the interconnection of CPUs is simplified, and the delay of inter-node accessing is shortened.

Optionally, each NC of each CN of the first computer subsystem and an NC of a corresponding basic node in a CN of the second computer subsystem are interconnected.

Figure 9:
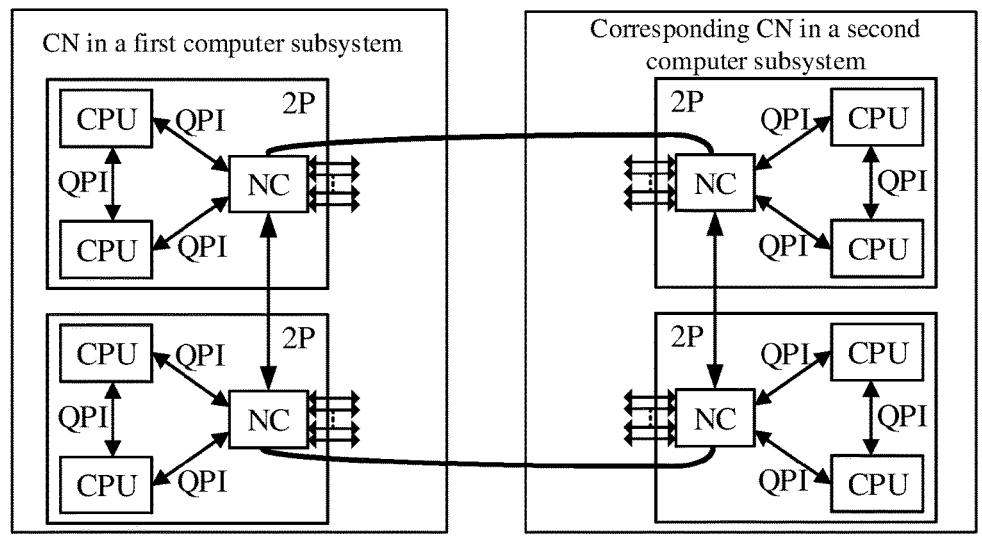
FIG. 9 is a schematic connection block diagram of corresponding CNs of two computer subsystems in a computer system according to an embodiment of the present disclosure.

For example, as shown in FIG. 9, each CN includes two basic nodes, that is, for example, a schematic diagram of a CN in the first computer subsystem, and a schematic diagram of a corresponding CN in the second computer subsystem, which are, for example, both first CNs. In FIG. 9, an NC of a first basic node in the first CN of the first computer subsystem is connected to an NC of a first basic node in the first CN of the second computer subsystem, and an NC of a second basic node in first CN of the first computer subsystem is connected to an NC of a second basic node in the first CN of the second computer subsystem.

It should be understood that the computer system corresponding to FIG. 9 may be considered to have a computer subsystem with the architecture shown in FIG. 1, where a CN of the computer subsystem includes four basic nodes, and the connections between NCs of the basic nodes are shown in FIG. 9.

Figure 10:
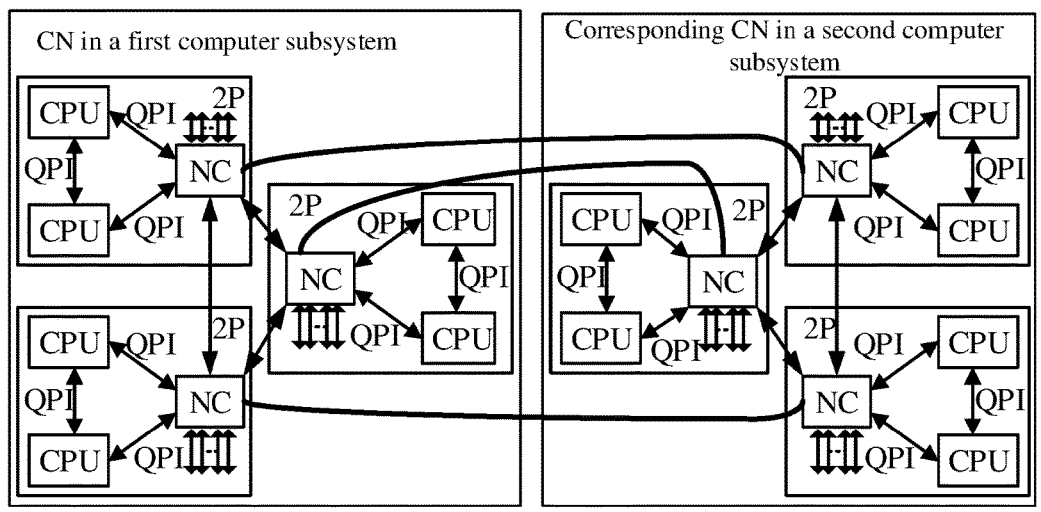
FIG. 10 is a schematic connection block diagram of corresponding CNs of two computer subsystems in a computer system according to another embodiment of the present disclosure.

Similarly, FIG. 10 is a schematic connection block diagram of corresponding CNs of two computer subsystems in a computer system according to an embodiment of the present disclosure. As shown in FIG. 10, each CN includes three basic nodes, for example, a schematic diagram of a CN in a first computer subsystem and a schematic diagram of a corresponding CN in a second computer subsystem, which are, for example, both first CNs. Each NC in each CN of the first computer subsystem and an NC of a corresponding basic node in a corresponding CN of the second computer subsystem are interconnected.

Therefore, in the computer system according to the embodiment of the present disclosure, through the interconnection of NCs of corresponding basic nodes in corresponding CNs of two identical computer subsystems, the number of CPUs of an interconnected system may be increased in an efficient way, the interconnection of CPUs is simplified, the reliability of the system can be improved, and the delay of inter-node accessing is shortened, thereby improving the running efficiency of the system.

It should be understood that the embodiment of the present disclosure is illustrated with an example where two identical computer subsystems form a computer system, but three or more identical computer subsystems may also form a computer system, where, optionally, each NC in each CN of each computer subsystem and an NC of a corresponding basic node in a corresponding CN of each of other computer subsystems are interconnected.

It should be understood that although the present disclosure has been described above in detail with reference to the accompanying drawings and exemplary embodiments, the present disclosure is not limited to this. Equivalent modifications or replacements may be made to the embodiments of the present disclosure by persons skilled in the art without departing from the spirit and essence of the present disclosure, and these modifications or replacements all fall within the protection scope of the present disclosure.

What is claimed is:

1. A computer subsystem, comprising L composite nodes (CNs), wherein each CN comprises M basic nodes, wherein each basic node comprises N central processing units (CPUs) and one node controller (NC), wherein L is an integer greater than or equal to 4, wherein M is an integer greater than or equal to 2, wherein N is an integer greater than or equal to 2, wherein each CPU in each basic node is directly coupled to all other N-1 CPUs in the same basic node, wherein each CPU in each basic node is coupled to the NC in the same basic node, wherein each NC of the M basic nodes in each CN is directly coupled to all other M-1 NCs of the M basic nodes in each CN, and wherein each CN is coupled to all other L-1 CNs through couplings between NCs of different CNs.

2. The computer subsystem according to claim 1, wherein each basic node comprises two CPUs.

3. The computer subsystem according to claim 2, wherein the computer subsystem comprises four CNs, wherein the four CNs comprises eight basic nodes, wherein the eight basic nodes comprises sixteen CPUs and eight NCs, and wherein each NC of the eight basic nodes is coupled to all other seven NCs of the eight basic nodes.

* * * * *